United States Patent
Meyer et al.

(10) Patent No.: US 7,156,223 B2
(45) Date of Patent: Jan. 2, 2007

(54) METHOD AND APPARATUS FOR TREATING A LAYER OF BULK MATERIAL

(75) Inventors: Hartmut Meyer, Buxtehude (DE); Thomas Staak, Hamburg (DE); Archibald Wallace, Hamburg (DE); Helmut Wallis, Henstedt-Ulzburg (DE)

(73) Assignee: Claudius Peters Technologies GmbH, Buxtehude (DE)

(*) Notice: Subject to any disclaimer, the term of this patent is extended or adjusted under 35 U.S.C. 154(b) by 0 days.

(21) Appl. No.: 11/263,850

(22) Filed: Nov. 2, 2005

(65) Prior Publication Data

US 2006/0081444 A1    Apr. 20, 2006

Related U.S. Application Data

(62) Division of application No. 10/459,709, filed on Jun. 12, 2003.

(30) Foreign Application Priority Data

May 8, 2003   (EP)   ................... 03010386

(51) Int. Cl.
    *B65G 25/04*   (2006.01)
(52) U.S. Cl. ................. 198/750.2; 198/750.3; 110/281
(58) Field of Classification Search .. 198/750.2–750.6; 414/156, 198, 525.1, 525.9; 110/281–283, 110/328
    See application file for complete search history.

(56) References Cited

U.S. PATENT DOCUMENTS

| 527,448 A | * | 10/1894 | Richards ................... 110/281 |
| 1,491,811 A | * | 4/1924 | Miller ..................... 110/281 |
| 2,240,590 A | | 5/1941 | Wallace |
| 3,225,722 A | | 12/1965 | Robson |
| 3,534,875 A | | 10/1970 | Hallstrom, Jr. |
| 4,144,963 A | | 3/1979 | Hallstrom |
| 4,563,959 A | * | 1/1986 | Fujiwara ................. 110/281 |
| 4,798,802 A | | 1/1989 | Ryan |
| 4,870,913 A | | 10/1989 | Schneider |
| 5,174,747 A | * | 12/1992 | Massaro et al. ............ 432/78 |
| 5,222,593 A | | 6/1993 | Quaeck |
| 5,482,155 A | | 1/1996 | Foster |

(Continued)

FOREIGN PATENT DOCUMENTS

DE   1296087   5/1969

(Continued)

OTHER PUBLICATIONS

Walsh, F. E. (1994) "Advances in Reciprocating Grate Coolers," *ZKG International* 47(5), pp. 252-256.

*Primary Examiner*—Patrick Mackey
*Assistant Examiner*—Mark A. Deuble
(74) *Attorney, Agent, or Firm*—Morrison & Foerster LLP

(57) ABSTRACT

The invention includes a method and an apparatus for treating, in particular cooling, a layer of bulk material by means of a stream of gas passed through it on a grate. The grate includes a plurality of elongated planks which extend in a conveying direction and are driven in advancing and return strokes in the conveying direction in such a manner that at least two adjacent planks are moved forwardly simultaneously and are moved backwardly non-simultaneously. Since the material located on a plank which is being moved back is prevented from completely following the plank moving back by the friction generated with the material located above the adjacent planks or with the wall, the conveying effect in the conveying direction outweighs the conveying effect in the opposite direction.

18 Claims, 10 Drawing Sheets

U.S. PATENT DOCUMENTS

2004/0115581 A1    6/2004    Meyer

FOREIGN PATENT DOCUMENTS

| DE | 3734043 | 4/1989 |
|---|---|---|
| DE | 19651741 A1 | 6/1998 |
| DE | 10018142 A1 | 10/2001 |
| DE | 10113516 | 9/2002 |
| DK | 1999-01403 | 4/2001 |
| EP | 0718578 | 6/1996 |
| WO | WO-2002/23112 | 3/2002 |
| WO | WO-2002/075230 A1 | 9/2002 |

* cited by examiner

METHOD AND APPARATUS FOR TREATING A LAYER OF BULK MATERIAL

REFERENCE TO RELATED APPLICATION

This application is a division of Ser. No. 10/459,709, filed Jun. 12, 2003.

FIELD AND BACKGROUND OF THE INVENTION

It is known to treat a bed of bulk material with gas by conveying it continuously over a grate so that the gas flows through it. To cool combustion material, for example cement clinker, it is customary to use what are known as pusher grates, which comprise overlapping rows of, in alternation, stationary grate plates and grate plates which are moved forward and back in a conveying direction (DE-A 3 734 043). The grate plates are used to blow cooling air into the bed of material, and this air is discharged above the bed of material in order for the heat to be recovered. For economic operation, pusher grates require complex mounting of the moving parts and are also complex since they are composed of relatively small parts. Another known design of grate makes use of a stationary, air-permeable supporting base, over which the layer of material is moved by means of scrapers which are moved continuously in the conveying direction or by means of reciprocating pusher members (EP-A 718 578; DE-A 10018142). The scrapers or pusher members have to be guided moveably through the grate surface from below, which is a complex arrangement. Moreover, they are exposed to high levels of wear within the hot layer of material. The passage of air is impeded and the cooling action restricted in the region of the grate in which they and their driving and sealing members are located. Yet a further type of cooler (DE-A 101 13 516) uses a large-area grate which is moved forward and back in its entirety, the bed of material being held in place by a blocker plate arranged at the start of the grate during the return stroke, so that the grate can slide beneath the blocker plate. This has the drawback that the grate length which can be utilized is limited on account of the barrier formed by the blocking action.

Working on the basis of the above prior art, the invention is based on the object of providing a method and an apparatus for treating, in particular cooling, a layer of bulk material which rests on a grate and has a stream of gas passing through it, which promise a simple structure and simple operation as well as uniform treatment of material even with a considerable grate length.

SUMMARY OF THE INVENTION

The method according to the invention uses a grate which comprises a plurality of planks which are elongate in the conveying direction. A plurality of these planks are moved forward and back in the conveying direction in order to move the material in the conveying direction. The movement is controlled in such a way that each individual plank in each case moves forward in the conveying direction together with at least one adjacent plank and in each case moves back at a different time from the adjacent planks. In this case, the width of the planks is made so narrow that during the backward movement of a plank the backward conveying action exerted on the material above it, which is based on the friction between the plank in question and the material, is lower than the forward conveying action or holding action which is based on the friction exerted by the respectively adjacent material or by the side walls. The result of this is that when a plank moves back between two stationary planks, the strip of material above it is mostly or completely held in place by the material located above the adjacent planks, and consequently to this extent does not follow the plank which has been moved back individually. When two or more adjacent planks together with the material located thereon move simultaneously in the conveying direction, surrounding an individual plank which is stationary or moving in the opposite direction, they also carry with them the or at least a significant part of the strip of material located on the latter plank. By suitable movement control, in which the return stroke of each plank is controlled in such a way that the adjacent planks hold the material located thereon in place while the forward stroke is always carried out by a plurality of adjacent planks simultaneously, the bed of material is conveyed in the conveying direction.

This conveying principle has long been known (DE-B 1 296 087, U.S. Pat. No. 3,534,875, U.S. Pat. No. 4,144,963). In the field of conveying technology, this principle does not play a major role, since it is generally simpler for the layer of material to be moved by means of pusher members or scrapers which move above the supporting surface. By contrast, in the context of the invention it constitutes a particular advantage, since there are no conveying members above the grate which would be exposed there to the possibly aggressive action of the treatment atmosphere or the material.

A further advantage of the invention consists in the fact that the mixing action exerted on the bed of material by the conveying movement is low. In particular, there is a lack of vertical mixing movement in the bed of material. The result of this is that in the case of a cooling process the treatment gas passes through the hottest layers last and the result is an improved recovery of heat compared to what is possible with more lively vertical mixing of the bed. Corresponding statements can also be made with regard to other types of heat or mass transfer. However, if a more intensive movement of material is desired, for example in order to avoid caking, this can be brought about by the forward conveying not taking place uniformly over the entire width of the grate, but rather in sections, so that a relative movement is generated between these sections. Another possible way of moving the material to a greater extent consists in selecting a higher grate frequency. Finally, a movement within the bed of material can be produced by stationary internals which project into the bed.

The return stroke is expediently faster than the forward stroke. Furthermore, it may be expedient if the plurality of planks constantly moves at the same speed in the conveying direction. This makes it possible to ensure that the layer of material always moves at a substantially constant speed without energy losses or disruptive shaking being produced by coming to a standstill and starting up again.

In the case of a combustion material cooler, it may be expedient for at least one plank close to the edge to be moved at a lower frequency and/or amplitude than the planks located further toward the inside, in order in this way to prevent the material at the edge of the bed from flowing undesirably quickly. Instead or in addition, it is possible to provide stationary edge planks. It is also possible for the other moving planks to be controlled differently with regard to frequency and amplitude, so that it is possible to take account of different demands imposed on material over the width of the grate. Specifically, depending on the nature of the combustion furnace connected upstream of the cooler and/or of the furnace discharge, it is possible that the properties of the material will not be uniform over the width of the bed. In order nevertheless to achieve a conveying speed which is identical or, depending on circumstances, deliberately different, it may therefore be desirable for the conveying movements of the planks in one part of the grate to be more intensive than in another part of the grate. A different conveying action on the part of the planks can also be achieved by some of them from time to time not participating in the stroke of the planks which are otherwise moved with them. By way of example, it is possible to provide for a plank to participate only in every other conveying stroke of the adjacent plank or for it to miss out on every seventh conveying stroke.

Finally, it is also possible to arrange suitable brakes which are formed by stationary obstacles in regions in which experience has shown that the material tends to reach higher speeds or even to shoot straight through. By way of example, stationary intermediate planks, which if appropriate may also be provided with flow obstacles projecting into the bed of material, may be provided between adjacent planks. It is also possible for internal fittings which project over the grate from the side walls to be provided, so that the uniform structure of the base does not have to be disrupted by internal fittings. The internal fittings which project over the grate from the side could have a height which is lower than the normal bed height, so that they constantly engage in the bed in order to prevent its edge regions from flowing more quickly. If it is merely necessary to prevent material above the normal bed from shooting straight through, their height is selected in such a way that they are located where such a phenomenon is to be expected, i.e. above the normal bed height.

The gap between adjacent planks is expediently sealed in order to prevent material from dropping through the grate and/or to prevent gas from passing through. The seal used is preferably a labyrinth seal in which a longitudinal strip which is secured to the edge of the plank is immersed in a bed of the material which is held by the adjacent plank or a special channel. A simple design of this principle is known (U.S. Pat. No. 5,222,593), in which an edge strip projects upward from the edge of one plank and an edge strip which projects downward from the other plank engages over it. In this case, however, the seal is located in the aggressive region of the material which is to be treated. Therefore, according to the invention preference is given to an embodiment in which the sealing arrangement is arranged beneath the planks. In this case, a longitudinal channel which is open at the top and in operation receives a bed of the material is arranged in a stationary position at the edge of one plank or separately. A longitudinal strip projects from the edge of the plank into this channel and into the bed which forms therein. Together, these parts form a seal preventing bulk material which enters the channel through the gap located between the planks from passing through. Moreover, the arrangement forms a seal or at least one flow obstacle to gas between the space beneath the grate and the space above the grate. A limited passage of gas may be desirable, so that the desired gas treatment in the bed of material can also take place above this sealing device. For this purpose, it will in many cases be sufficient for one side of the upwardly open channel to be connected to the space beneath the grate.

According to a particular feature of the invention, the sealing device or a stationary intermediate plank located between two adjacent planks is supported by a stationary wall which separates the spaces beneath the grate below the adjacent planks from one another. This enables the material located on adjacent planks to be ventilated to different extents.

During operation, the strip which projects downward into the channel from the edge of a plank should always maintain a sufficient spacing from the channel walls, so that the material is not crushed between the strip and a channel wall. This can be achieved by making the lateral spacing between the strip and the channel walls greater than the lateral guide clearance of the planks including any thermal expansion. Furthermore, for the same purpose it may be expedient for the gap between the bottom edge of the strip and the base of the channel to be smaller than the gap between the strip and the channel wall.

If the channel is provided in a stationary position, a longitudinal strip may project downward into this channel from each of the two plank edges which are to be sealed with respect to one another. However, it is also possible for the channel to be connected to the edge of one plank and for the downwardly projecting strip to be connected to the edge of the other plank.

That part of the channel which is in direct communication with the plank gap will generally be completely filled with bulk material. During the relative movement of the strip and the channel with respect to one another, some bulk material will also pass through to the other side beneath the strip. The vertical spacing between the lower edge of the strip and the channel base should be small, so that this passage of material is inhibited. Moreover, the channel walls should be high enough to reliably prevent the material from overflowing into the space beneath the grate. An overflow of this type is unlikely because the channel is constantly emptying itself. Because the strips of adjacent planks are moved forward together and back individually, the bed of material located in the channel will be moved to a greater extent in the conveying direction than back and will be pushed out of the end of the channel, which should be open for this purpose. Since there is no risk of the material moving backward, the rear end of the channel, adjacent to the feed end of the grate, can be open.

It is customary to connect a short section of grate whose feed surface is particularly suitable for direct feed of the material which drops out of the furnace and which is consequently referred to as a feed section upstream of the grate of a combustion material cooler. During their movement, the feed-side ends of the planks of the grate section according to the invention move more or less far under the feed section. For the relative movement, they require a certain clearance between their top side and the underside of the feed section. To prevent cool air from entering the bed of material from the space beneath the grate, which is under excess pressure, as a result of this clearance without having flowed through and cooled the grate, it is expedient to provide a sealing arrangement in the region of which this clearance is reduced.

Advantageously, the top side of the grate is provided over substantially its entire surface with hollows in which cooled material collects, preventing direct contact between the grate and hot layers of material. The feed-side ends of the planks are expediently also equipped with hollows of this type. When they move under the feed section of the cooler and there is no longer any load from the bed of material at that location, there is a risk of the treatment gas which penetrates into the hollows from below blowing out the contents of the hollows or at least the fine material. According to a further feature of the invention, therefore, there is provision for the air passage openings in the hollows to be blocked off from the supply of air when they are located beneath the feed section of the cooler.

An important advantage of the invention consists in the fact that the wear to the grate and its bearing members does not impair its function. Therefore, the bearing members can be of simple configuration. By way of example, the grate may be mounted on rollers.

BRIEF DESCRIPTION OF THE DRAWINGS

The invention is explained in more detail below with reference to the drawing, which illustrates an advantageous exemplary embodiment. In the drawing.

DETAILED DESCRIPTION OF THE INVENTION

Figure 1:
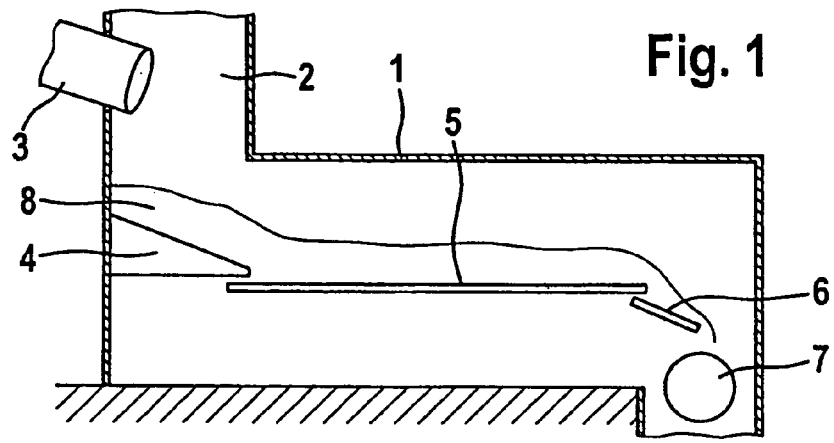
FIG. 1 shows a diagrammatic longitudinal section through a combustion material cooler.

In accordance with FIG. 1, a cooler housing 1 forms a feed shaft 2 within which the end of a rotary tubular kiln 3 opens out. In the feed shaft 2, the material 8 drops onto a feed section 4 of the cooler, from where it passes onto the grate section 5 which is formed and operated in accordance with the invention. Where the following section, without any additional definitions, refers to the grate, this term is to be understood as meaning the grate section. The possibility of differently designed grate sections following or being connected upstream of this grate section should not be ruled out. The grate 5 is arranged substantially horizontally. It can be arranged with a slight downward gradient, in order in this way to increase the resistance which prevents the material from following a grate plank as the latter moves back. On the other hand, this makes it easier for the material to move in the conveying direction and reduces the amount of energy required for the conveying. However, the grate 5 may also be laid such that it rises slightly if it is important to prevent the possibility of relatively free-flowing material shooting straight through (the "Red River" phenomenon). At the end of the grate 5, the material can be discharged directly or via a further grate section 6, for example to a crusher 7.

The grate 5 is composed of a plurality of planks 10 arranged parallel and next to one another. Examples with three and five planks are diagrammatically depicted in FIGS. 2 and 3, respectively. Successive functional phases illustrate the sequence of movement of the planks therein.

Figure 2:
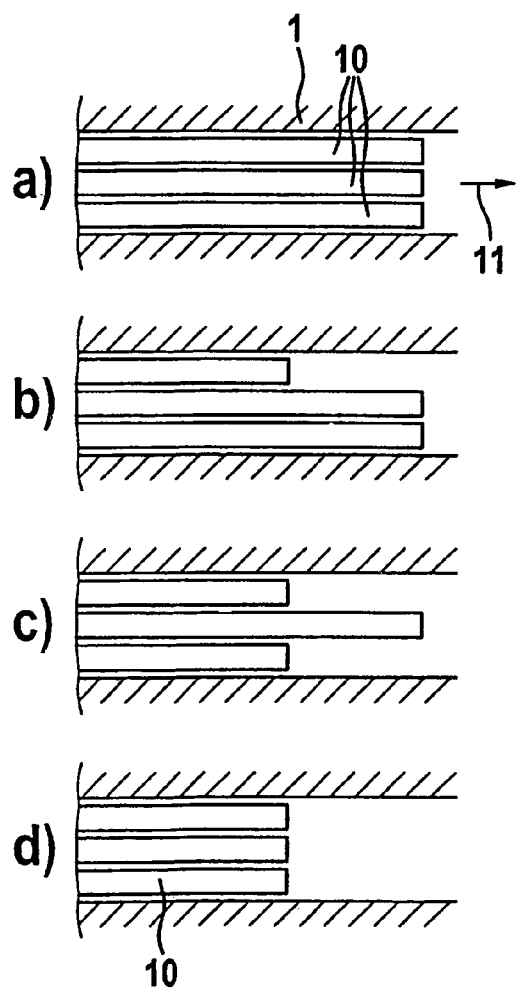
FIG. 2 shows diagrammatic partial plan views of the cooling grate of a first embodiment in various stages of operation.

FIG. 2a illustrates all three planks 10 in their position which is furthest advanced in the conveying direction 11. Their forward movement stops in this position. Then, they are moved back individually, as illustrated in FIGS. 2b, c and d. As soon as they have all adopted their fully retracted position indicated in FIG. 2d, they start the joint forward stroke again until they have once again reached the position shown in FIG. 2a. During the common forward stroke, they carry with them the bed of material located on them. When the planks are moved back individually, by far the majority of the material located on them cannot follow this movement, since it is held in place by the friction which is exerted on it by the material which is located on the adjacent planks and/or by the side walls. In the case of the sequence of movement illustrated in FIG. 2, it is assumed that during the movement phase in which the planks are being moved back individually the other planks are in each case stationary.

Figure 3:
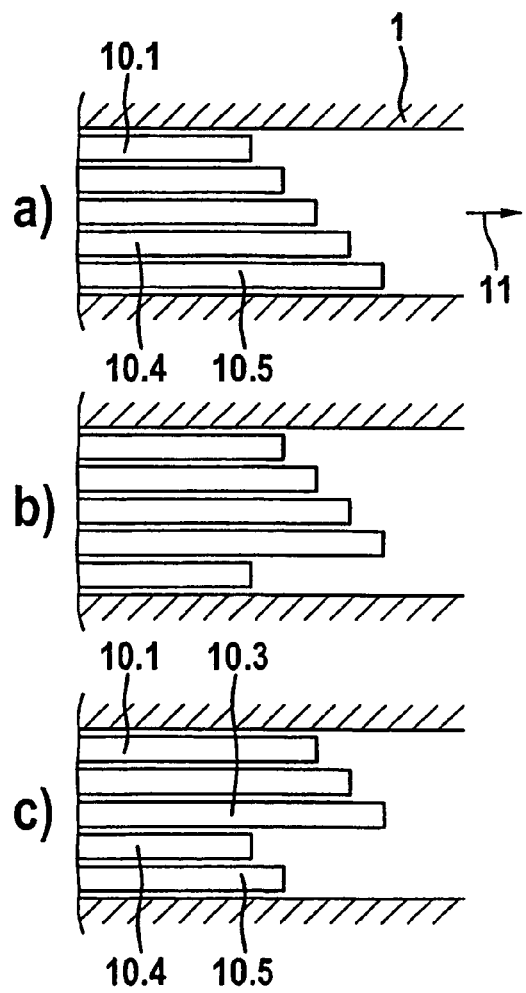
FIG. 3 shows plan views corresponding to FIG. 2 of a second embodiment.

By contrast, the sequence of movements illustrated in FIG. 3 is based on the assumption that all the planks with the exception of in each case one plank, which is being moved back, are moving uniformly forward. FIG. 3a illustrates the state in which the plank 10.1 which has just been drawn back is in its rearmost position, while the plank 10.5 has reached its furthest advanced position. During the time between this figure and the next state illustrated in FIG. 3b, all the planks 10.1 to 10.4 move slowly forward synchronously while the plank 10.5 is drawn back into the rear starting position. In the next phase leading up to state 3c, the planks 10.1 to 10.3 and 10.5 move a step forward while the plank 10.4 is drawn back into the rear starting position, and so on. If the forward movement is to be continuous, in this example the backward movement must be at least five times as quick as the forward movement.

In the examples shown in FIGS. 2 and 3, it has been assumed that all the planks have identical rates of advance. This is not necessary. Rather, the advancing speed of the individual planks can be controlled differently or may be set differently from the outset. By way of example, there are the abovementioned technical grounds for moving the planks 10.1 and 10.5 close to the edges more slowly than the planks which are closer to the center.

Furthermore, in the examples it has been assumed that the planks are moved back individually. However, it is also possible for two planks to be retracted simultaneously when they are at a sufficient distance from one another and the other planks are sufficient to hold the material located above the planks being retracted in place. By way of example, in the example shown in FIG. 3 it would be possible for the planks 10.1 and 10.4, on the one hand, and the planks 10.2 and 10.5, on the other hand, in each case to be retracted simultaneously. This applies both to the continuous procedure which has been explained with reference to FIG. 3 and to the discontinuous procedure which has been explained with reference to FIG. 2.

In FIGS. 2 and 3, it has been assumed, for the sake of simplicity, that the planks directly adjoin one another at the walls of the cooler housing 1. This is not necessarily the case. By way of example, if the grate is arranged inclined downward, it may be expedient for stationary strips or planks to be arranged between the individual moving planks, having the effect of decelerating the material in order to prevent it from shooting straight through. Furthermore, with a horizontal or downwardly inclined arrangement of the grate, it may be appropriate to hold in each case one edge strip which directly adjoins the walls 1 in a stationary position.

Internal fittings can be used to additionally increase the resistance imparted to the material with regard to movement in the opposite direction to the conveying direction. By way of example, it is possible for the spacing between the side walls of the cooler housing 1 or between additional internal fittings to taper in the opposite direction to the conveying direction 11.

The planks 10 include air passage openings 12 in a distribution which is as uniform as possible. Experience gained from other types of cooling grates also applies to the formation and arrangement of these openings. In accordance with FIGS. 4 and 5, hollows 14 on the top side of the plank are divided from one another by transverse walls 13 and are dimensioned in such a way that bulk material is retained therein. This forms a protective layer with respect to the hot and abrasive bed of material located above. This is also known from other types of cooler.

The hollows 14 can be dispensed with if the material is relatively unabrasive or if the surface of the planks 10 is made sufficiently wear-resistant. In this way, it is possible to influence the coefficient of friction between grate and material. This can also be achieved in a different way by means of the width of the grate if it is desired for the material in certain areas of the width to be influenced to a greater extent by the friction of the adjacent material than by the plank below.

Figure 4:
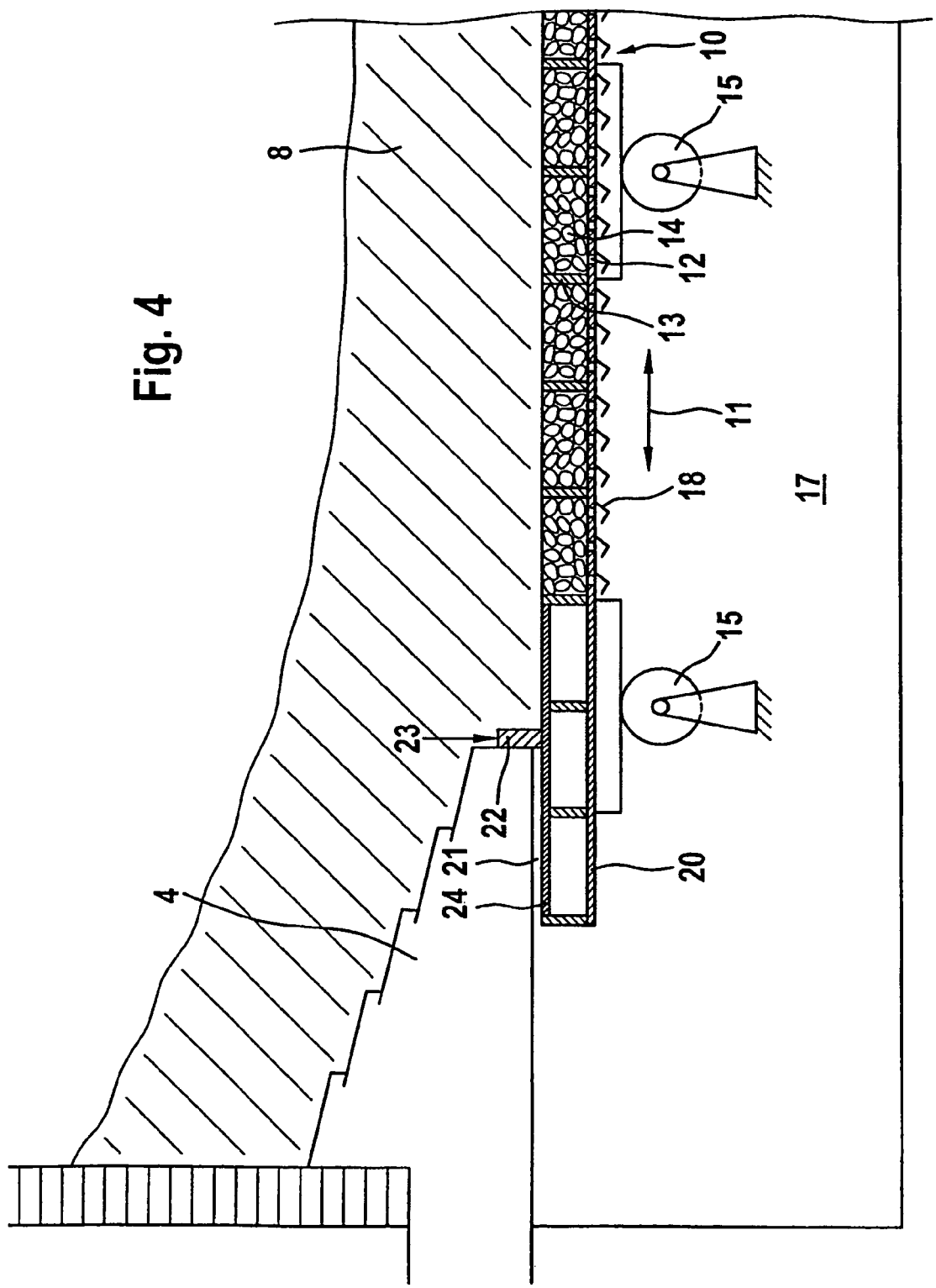
FIG. 4 shows a partial longitudinal section through a first embodiment of the cooler.
Figure 5:
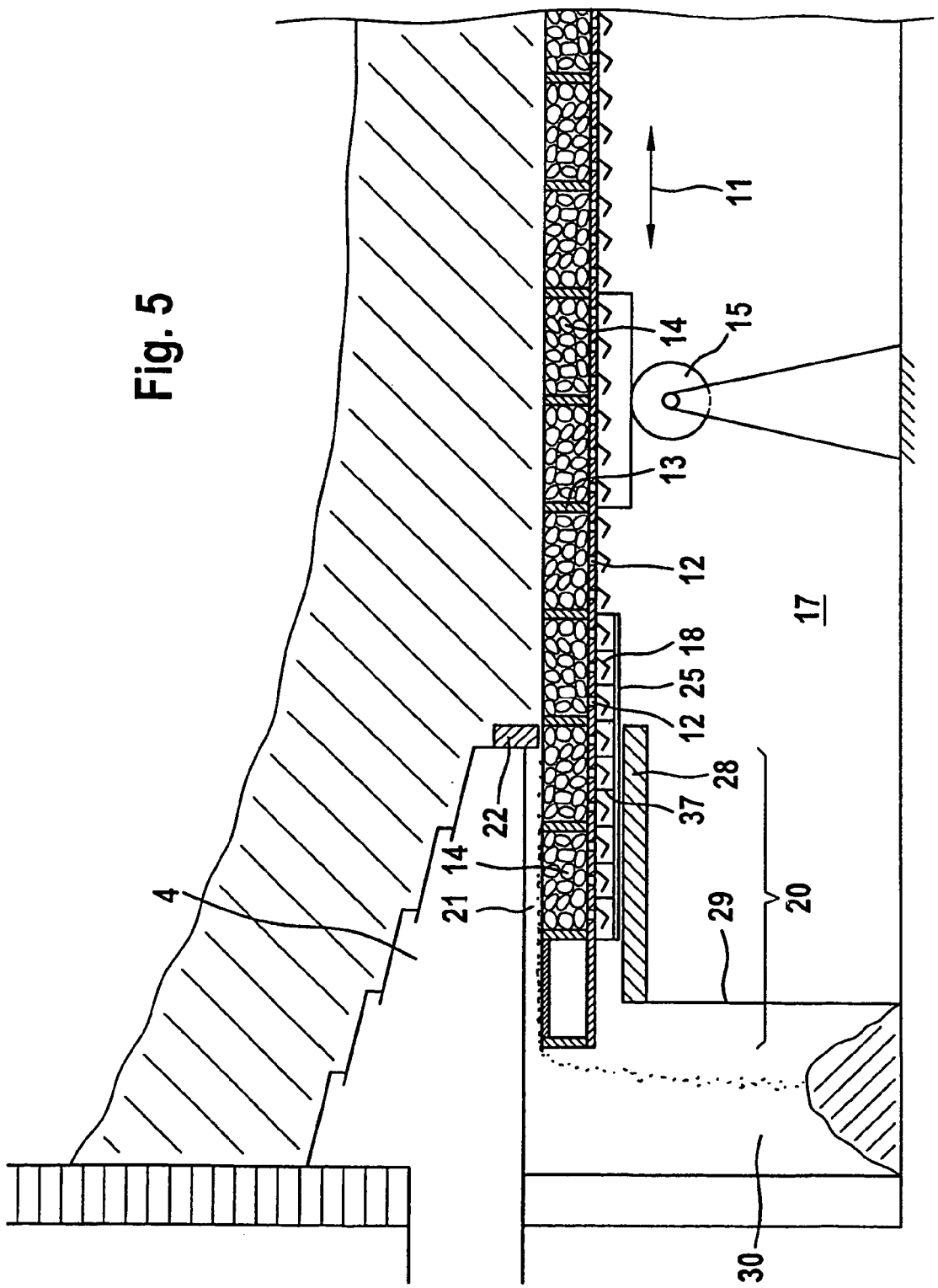
FIG. 5 shows a longitudinal section, corresponding to FIG. 4, through a second embodiment of the cooler.

In FIGS. 4 and 5, it has been assumed that the space 17 beneath the grate is subject to excess pressure and as a result the cooling air is forced from the space beneath the grate through the grate openings 12 and through the bed of material 8. To ensure that any particles which drop down through the grate openings 12 do not pass into the space 17 beneath the grate, catching profiled sections 18, which catch the material which drops through the grate and allow it to be returned upward into the bed by the flow of air, are located beneath the openings 12.

Instead of the grate being ventilated by excess pressure in the space beneath the grate, it is also possible for the planks in their entirety or in sections to be connected to compressed-air sources via flexible passages. This provides the option of providing the bed of material with different levels of ventilation in different areas across the width and along the length.

The planks 10 may be mounted on rollers 15. They are connected to a drive (not shown) which enables them to be advanced in the conveying direction 11 and then retracted again.

Figure 6:
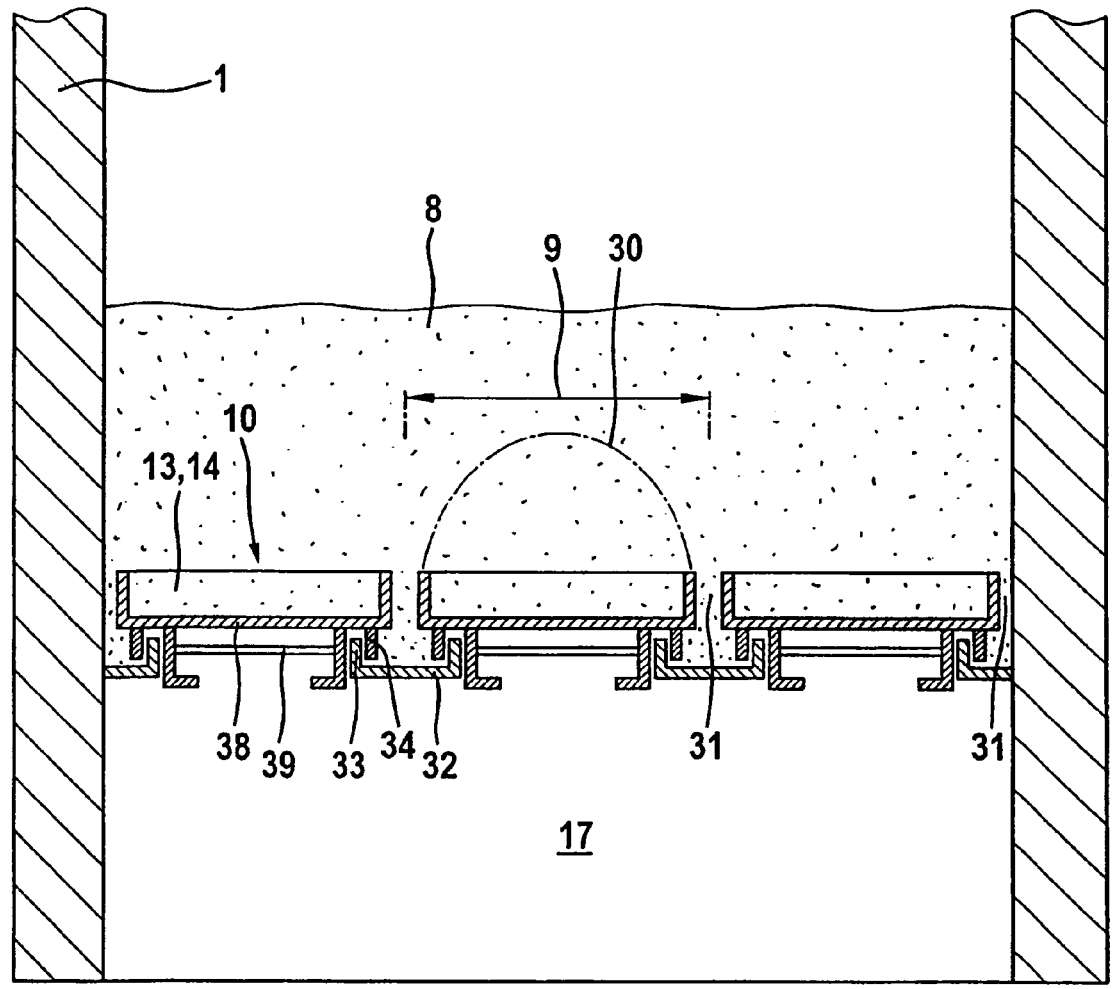
FIG. 6 shows a cross section through a cooler.

The sectional view shown in FIG. 6 presents the cross section through three planks 10 in the cooler housing 1, the top side of which planks is formed by the hollows 14 divided up by walls 13 and on which planks the bed of bulk material 8 rests. Moveable components are provided with hatching which starts at the bottom left and runs to the top right, while stationary components are provided with hatching which runs from the top left to the bottom right. The width 9 of the individual planks is such that the movement of that part of the layer of material 8 which is located above them in the conveying direction and/or in the opposite direction to the conveying direction is determined to a greater extent by the friction from the adjacent areas of material or the walls 1 and by the associated plank 10. More specifically, it is impossible to prevent a part of the material located close to the plank surface (for example the area below the dot-dashed line 30) from participating to some degree in the movement of the plank, depending on the distance from the plank. However, a large proportion of the material located above the plank will not participate in the return movement of the plank if the adjacent planks are stationary or are being moved in the opposite direction.

The higher the bed of material compared to the plank width, the greater the influence of the friction of the adjacent material or of the cooler wall on the material located above the plank compared to the influence emanating from the friction of the plank. Consequently, the efficiency of conveying increases as the ratio of the bed height to the plank width increases. The method is expediently operated in such a way that this ratio is no less than 0.7, preferably no less than 0.9, or the plank width is selected in such a way to be no greater than the reciprocal of this number, based on the projected bed height. It is preferable for the ratio of bed height to plank width to be in the range from 1 to 1.2.

Figure 7:
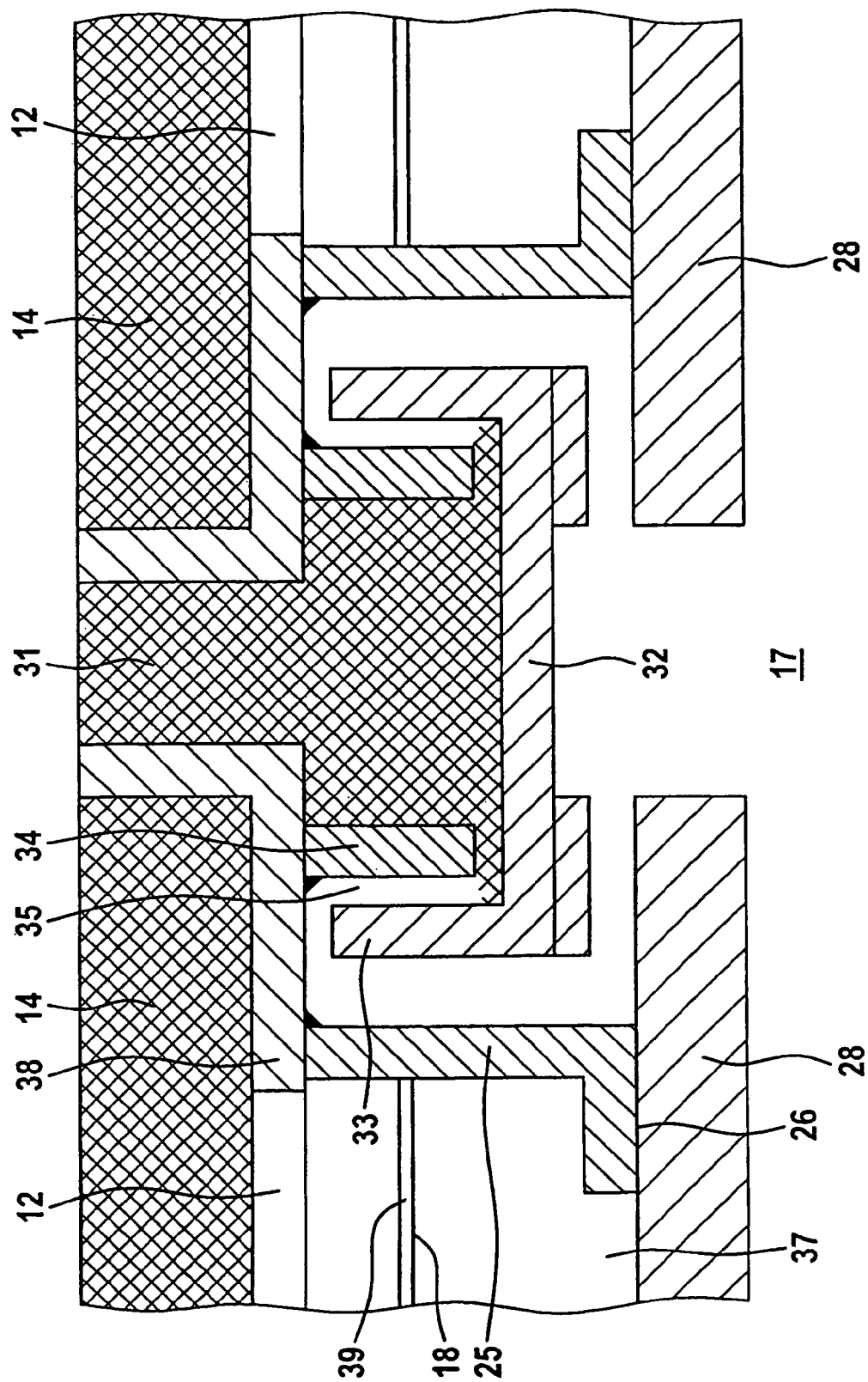
FIG. 7 shows a partial section through a sealing arrangement on a larger scale.

Between the planks 10 or between the planks close to the edge and the wall 1 there is a gap 31, through which material can penetrate downward. In a stationary position beneath the gap 31 there is a channel 32 with walls 33 which receives the material which drops through. At the planks 10, close to their edges, there is in each case one downwardly projecting strip 34 which is immersed in the channel 32 and the bottom edge of which is at only a short spacing from the base of the channel 32. The material, which in FIG. 7 is indicated by cross-hatching, therefore cannot pass without resistance into the space 35 between the channel walls 33 and the strips 34. The arrangement described represents a seal preventing material from passing through the space 17 beneath the grate.

The ratio between the spacing formed between the lower edge of the strip 34 and the base of the channel 32 and the height of the material in the gap 35 between the strip 34 and the wall 33 of the channel 32 is of considerable importance for the sealing function. The height of this gap is expediently 3 to 20 times the abovementioned spacing, more preferably approximately 8 to 12 times as great. In an exemplary embodiment which has proven successful, the spacing between the lower edge of the strip 34 and the base of the channel 32 is 2–5 mm and the height of the wall 33 is 80 mm.

If the resistance to which the material is subject as it passes through this sealing arrangement should in specific instances be insufficient, the channel 32 can be pressed upward by spring force, so that the base of the channel bears against the lower edge of the strips 34 substantially without any gap. However, this measure will not normally be necessary, since the material which passes through the gap 31 into the channel 32 is continuously conveyed out of the channel in the longitudinal direction. The conveying principle means that the strips 34 will never be moving simultaneously in the opposite direction to the conveying direction within the stationary channel 32 but always moves simultaneously in the conveying direction. Consequently, the conveying effect which is exerted on the material located in the channel 32 in the conveying direction is stronger than the conveying effect in the opposite direction. The channel 32 is open at its delivery-side end, so that the material can drop out at that end. If, depending on the arrangement of the grate and the type of material, it should emerge that material also drops out of the channel 32 at the feed-side end of the grate, suitable collection features (chamber 30) or seals can be provided at that end preventing the material from escaping. However, the fact that the material is conveyed in the conveying direction in the channel means that this measure will not normally be required.

The lateral spacing between the walls 33 and the strips 34 is selected in such a way that they do not under any conditions make contact with one another or come so close to one another that the material located between them is crushed. Accordingly, the spacing between them should be greater than the expected lateral displacement of the strip 34 caused by the movement clearance of the plank and the thermal expansions.

Figure 8:
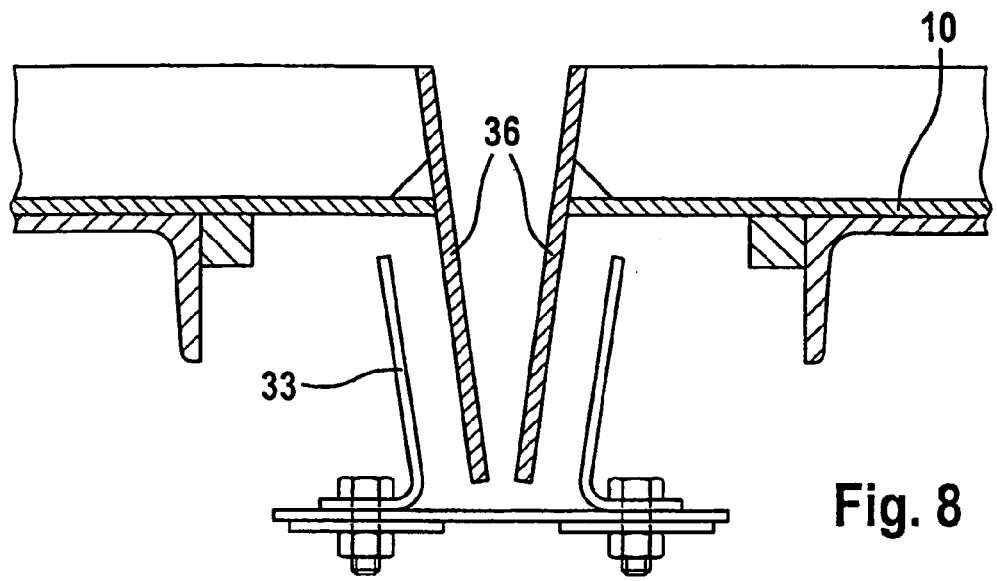
FIG. 8 and FIG. 9 show further exemplary embodiments of sealing arrangements.

The risk of the material being crushed between adjacent planks can be reduced by their opposite side walls 36 enclosing a gap which widens upward in the shape of a wedge, in accordance with the example illustrated in FIG. 8. This prevents the material from becoming jammed in the gap, which could lead to the planks being lifted up.

Figure 9:
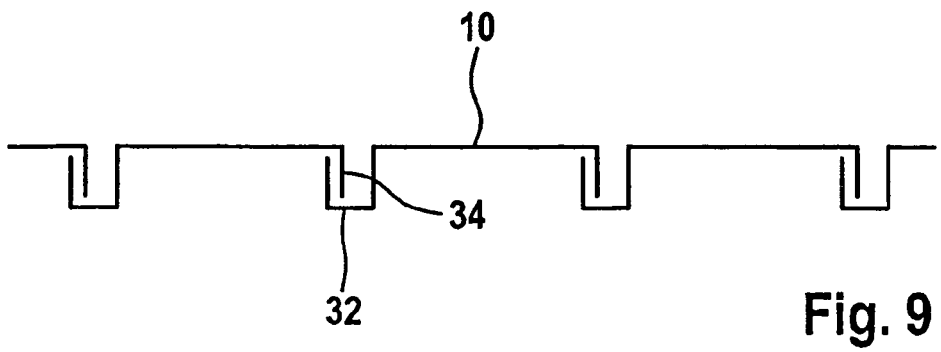

According to a further exemplary embodiment, which is shown in FIG. 9, the strip 34 is arranged at the edge of a plank and the channel 32 which interacts in a sealing manner therewith is arranged at the edge of the adjacent plank, beneath the latter.

Figure 14:
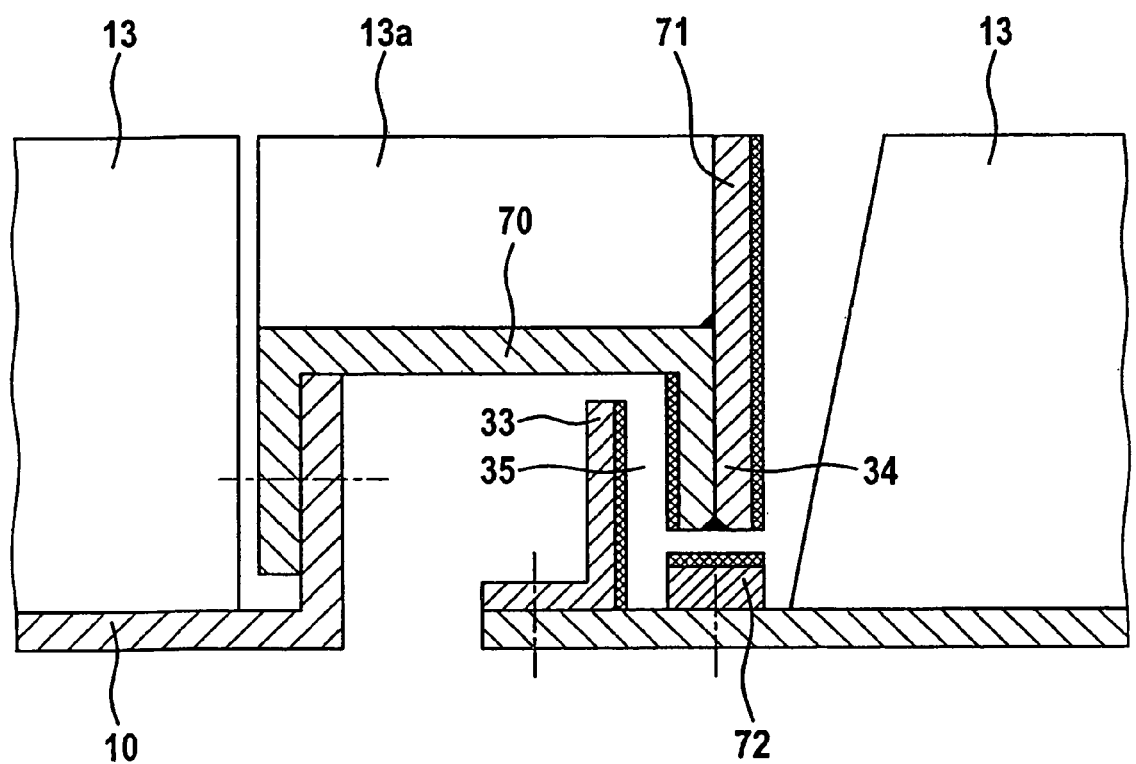
FIG. 14 shows a variant of FIG. 9.

Yet another exemplary embodiment for the sealing between adjacent planks is shown in FIG. 14. A U-shaped profiled section 70, which bears a side wall 71, is secured continuously in the longitudinal direction to the edge of the plate 10 which can be seen on the left-hand side of the drawing. This wall 71 laterally delimits the hollows (number 14 in FIGS. 4 and 6) which are formed by transverse webs 13 above the planks 10. The planks 13 are continued by 13a above the U-shaped profiled section 70.

The side wall 71 forms a downwardly projecting limb 34 which projects downward into the bed of material formed on the adjacent plank 10 (on the right-hand side in the drawing) and interacts with a wall 33 which projects upward from the edge of this adjacent plank 10 to form a labyrinth seal. The walls 33, 34 enclose a gap 35 and interact in a sealing manner in the same way as has been explained above with reference to FIG. 7. The cross-hatched areas indicate surface reinforcement of those profiled-section parts which are exposed to high levels of wear on account of their relative movement with respect to the opposite surfaces or beds of material. For the same reason, a strip 72, which forms a sealing gap with the end face of the wall 34 and is likewise reinforced, is provided beneath the wall 34 opposite its end face. Reinforcements of this type may also be provided in the other embodiments of the sealing devices.

The design of the sealing device shown in FIG. 14 has the advantage over some of the other sealing devices explained above that sealing surfaces which move to a lesser extent relative to one another are positioned opposite one another, and therefore the structural outlay and the frictional energy which has to be applied are lower.

Figure 10:
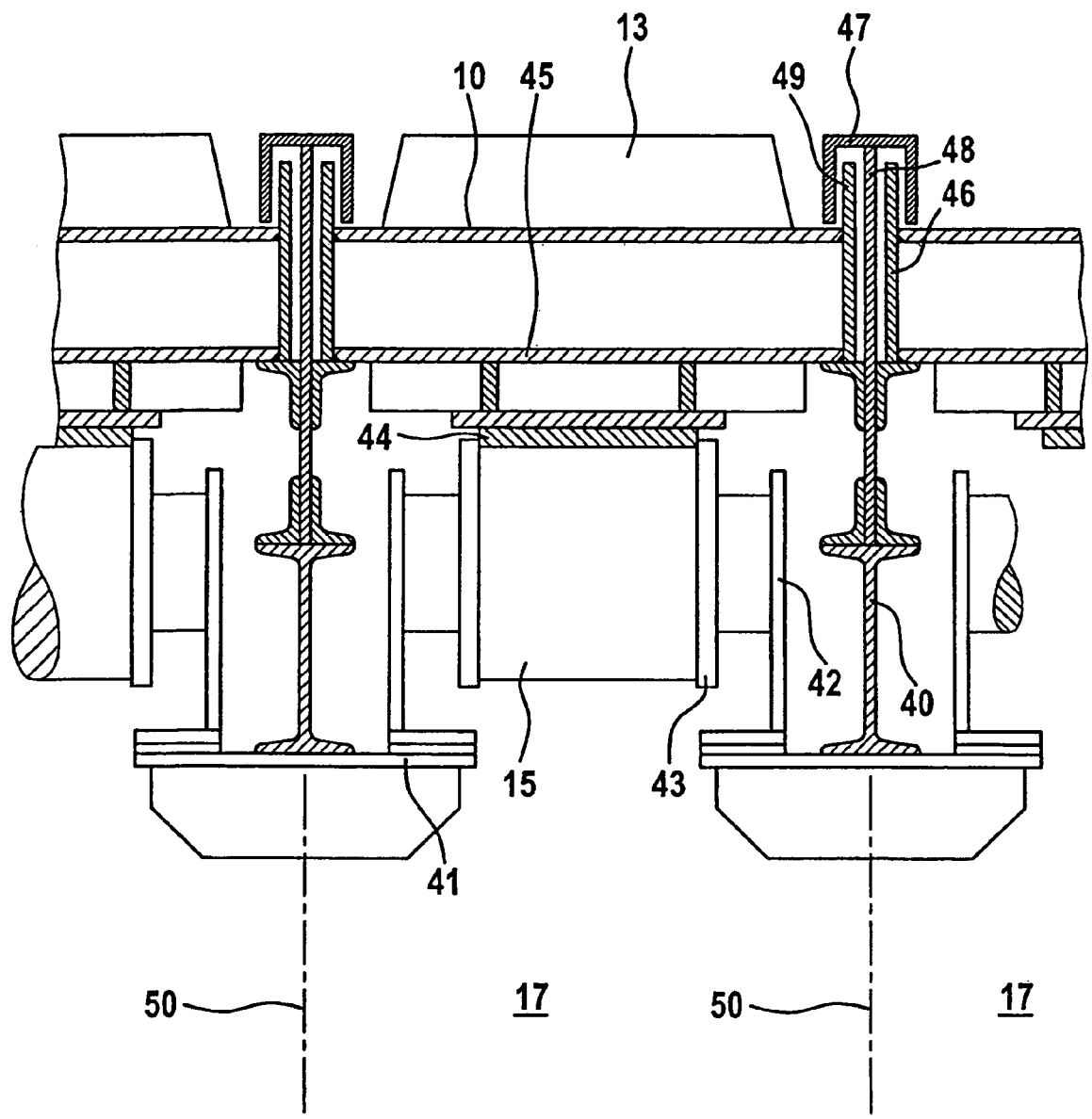
FIG. 10 and FIG. 11 show a cross section and an isometric illustration of a further embodiment.
Figure 11:
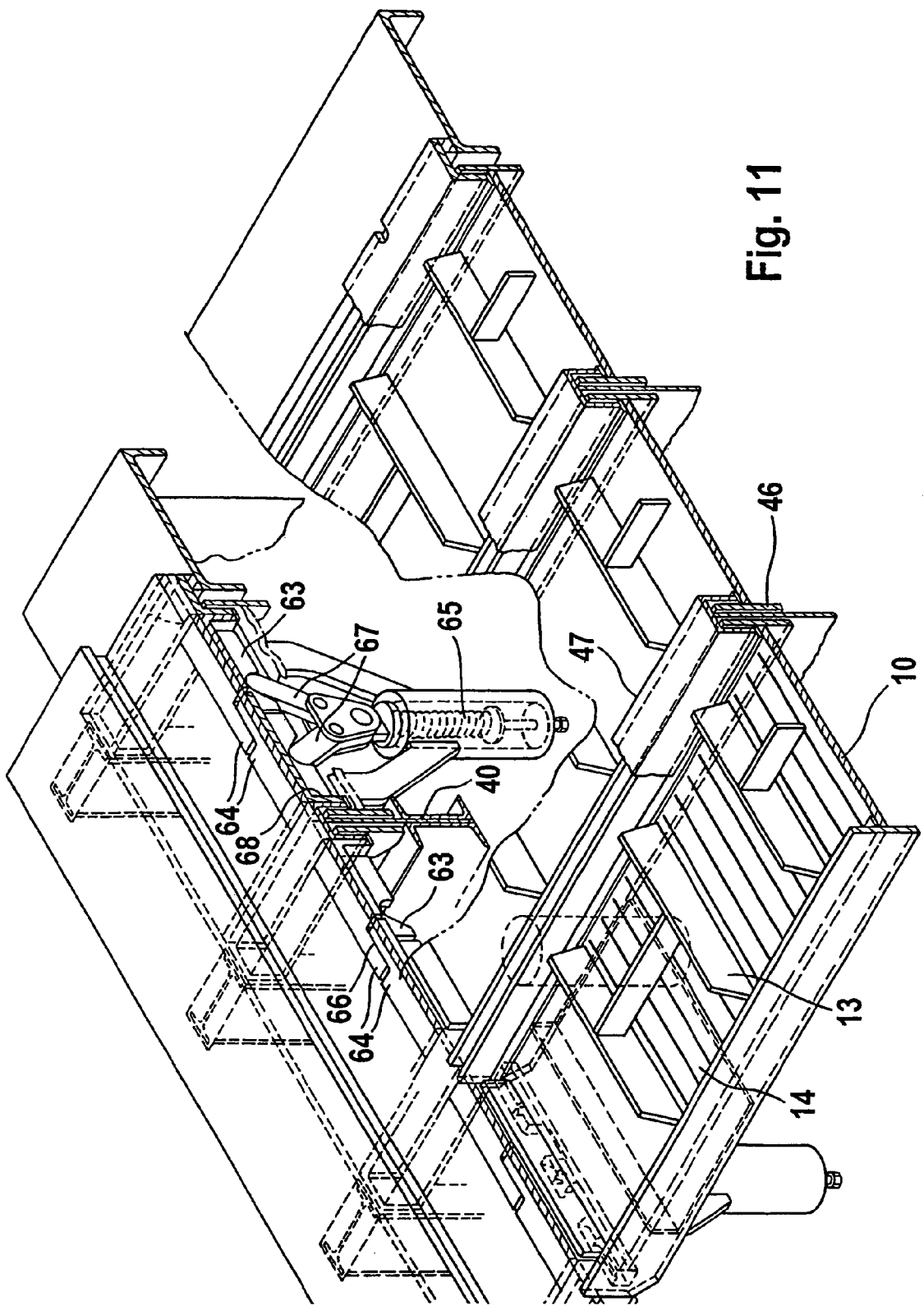
Figure 13:
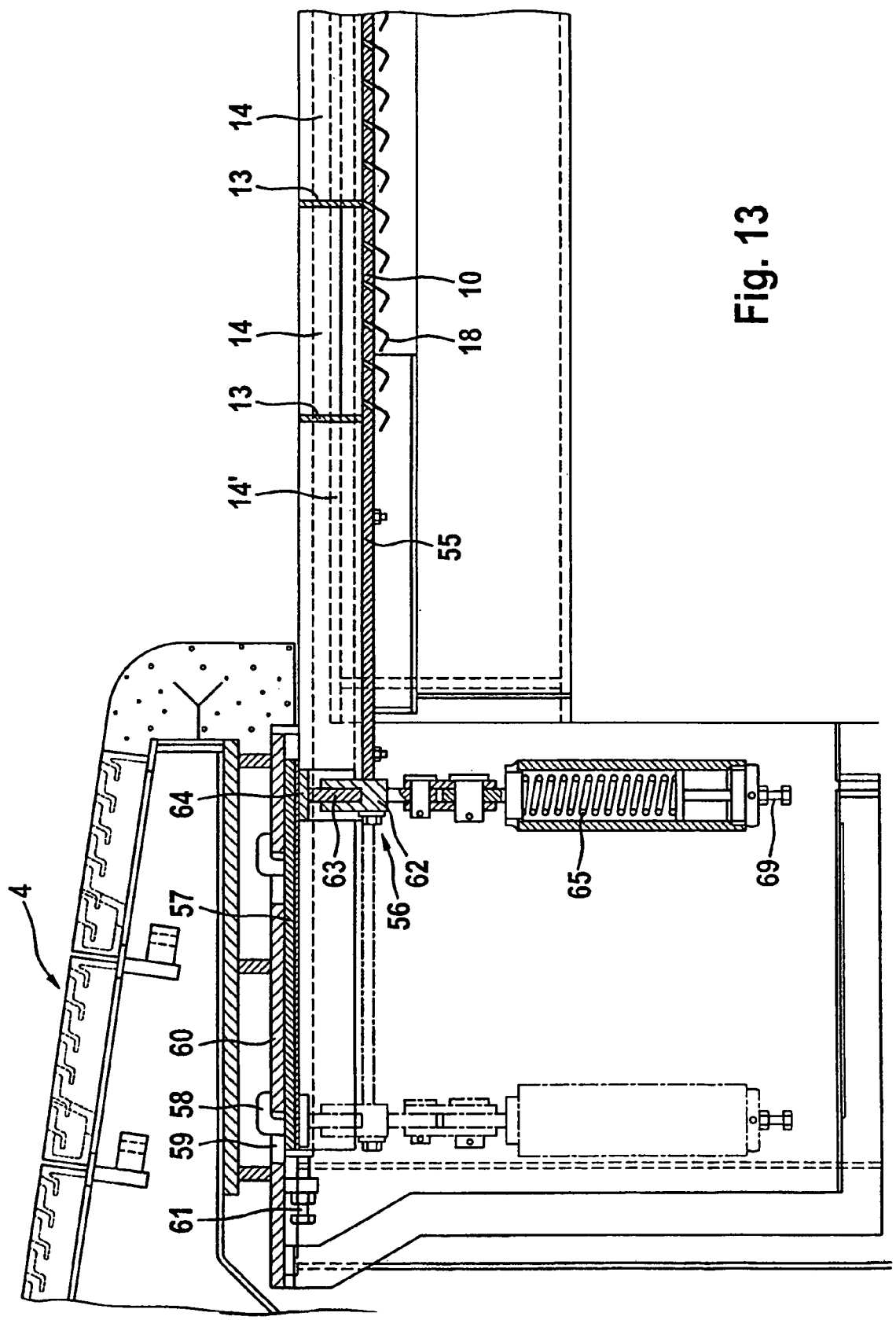
FIG. 13 shows details of the seal between the grate sections.

Details of a structure which is preferred for practical use can be seen from FIGS. 10, 11, 13. Horizontal, parallel longitudinal supports 40 which bear the grate are arranged in the cooler housing. Brackets 41, which in each case bear bearing seats 42 for rollers 15, are secured to them at predetermined longitudinal intervals. Rolling plates 44 which are rigidly connected to side cheeks 46 of the planks 10 via transverse supports 45, rest on the rollers 15. Each plank 10 is supported by a plurality of rollers 15 arranged one behind the other. At least one of these rollers is driven in reciprocating fashion in order to impart the conveying movement described above to the plank, or else the planks are driven directly by hydraulic piston-cylinder devices. There are devices for laterally guiding the planks, for example laterally running wheel flanges 43 at the rollers 15, which are matched to the width of the rolling plates 44.

Transverse walls 13, between which the hollows 14 mentioned above are formed, are secured to the planks 10 at predetermined longitudinal intervals.

The gap between adjacent planks 10 is sealed by those parts 49 of the side cheeks 46 of the planks 10 which project above the planks having a stationary sealing profile 47, which in cross section is in the form of an inverted U shape and the lateral limbs of which form strips which are immersed in the bed of material located on the planks in a similar manner to the strips 34 in the exemplary embodiment illustrated in FIG. 7, engaging over them. In terms of the sealing action, they cooperate with those sections 49 of the side cheeks 46 which project above the planks 10 and the arrangement and function of which corresponds to the walls 33 of the exemplary embodiment shown in FIG. 7. The sealing profile 47 is supported by holders 48 which project through between the planks 10 and their adjacent side cheeks 46 and are supported by the longitudinal supports 40.

Figure 12:
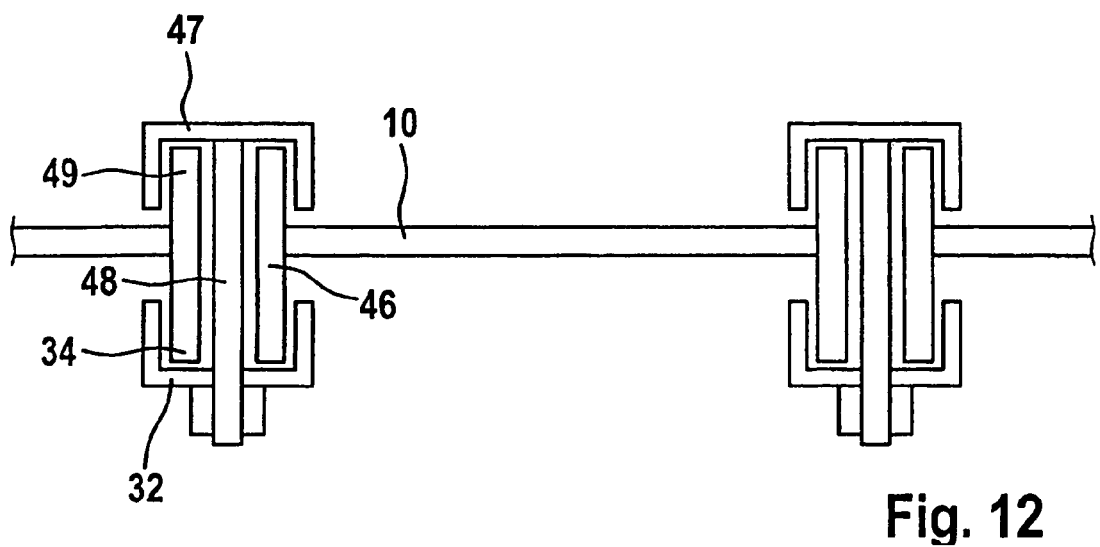
FIG. 12 shows a further form of the seal.

The top-side seal produced by means of the sealing profiled section 47 and illustrated in FIGS. 10 and 11 can be supplemented by an underside sealing arrangement of the type illustrated in FIG. 7. This is illustrated in FIG. 12. It can be seen that the side cheeks 46, which at the top side interact with the sealing profiled section 47 described above to form the seal arranged at the top side of the planks 10, toward the bottom form strips 34 which are immersed in a channel 32 located at the underside.

When viewing FIG. 10, it will be seen that it is readily possible for the space beneath adjacent planks 10 to be separated by walls 50, which are indicated by dot-dashed lines. In this case, the holder 48 will also be designed in a similar way to a continuous wall, so that no flow communication remains between the spaces 17 beneath adjacent planks 10. The separate spaces beneath the planks can if desired be acted on by different pressures, in order to force difference quantities of cooling air through the layer of material located on the associated planks. If the bed of material has different properties on adjacent planks, for example different mean grain sizes or different bed heights or different temperatures, it is possible to take this into account by differentiating the air supply. For this purpose, cooling-air sources which can be set differently are provided for the separate spaces 17. The grate according to the invention is particularly suitable for the above-described separation of the spaces beneath the grate by longitudinal partitions, since the longitudinal partitions can be connected to the sealing members which continue in the longitudinal direction between adjacent planks. It is also readily possible to provide transverse walls in the space 17 beneath the grate, enabling sections which follow one another in the conveying direction to be ventilated differently.

In FIG. 7, the air passage openings 12 in the base 38 of the planks 10 can be seen as slots running transversely with respect to the longitudinal direction. Beneath each slot 12 there is a catching profiled section 18, the downwardly facing edge 39 of which can be seen in FIG. 7.

As has been diagrammatically depicted in FIGS. 1, 4 and 5, the ends 20 of the planks 10 pass beneath the feed section 4 in order to adjoin it without any gaps. To ensure that the air which is under excess pressure does not flow out of the space 17 beneath the grate through the gap 21 between the top side of the plank part 20 and the underside of the feed section 4 or to ensure that material does not pass into the space 17 beneath the grate in the opposite direction to the conveying direction 11, there is a sealing strip 22 which in the design variant shown in FIG. 4 tightly adjoins the end face of the grate section 4 arranged in front of it and is pressed onto the surface 24 of the plank end 20 by spring force 23. To ensure that the sealing strip 22 can be fitted tightly onto the top side 24, in the plank part 20 this top side is designed to be smooth without any hollows 14. This means that the surface 24, when it is not directly beneath the feed section 4, is directly exposed to the wear caused by the still very hot material, and accordingly has to be designed to be correspondingly resistant to high temperatures and wear.

If it is desired to avoid this outlay, the alternative design shown in FIG. 5 comes into consideration, which is substantially equivalent to that shown in FIG. 4 apart from the fact that the plank end 20, to the extent to which it may also be exposed to the hot material during the advancing stroke, is also equipped with hollows 14 on the top side. In this case, the sealing strip 22 is mounted in a fixed position and its lower edge ends at a short distance above the walls 13 which enclose the hollows 14.

As long as the hollows 14 are located beneath the feed section 4, they should be cut off from the compressed air supply, otherwise there is a risk of some of the bulk material which is located in the hollows 14 and is required to protect the planks being blown out. The arrangement described below with reference to FIGS. 5 and 7 is used for this purpose. At least in the rear part 20 of the planks 10, the catching profiled sections 18 are surrounded by side cheeks 25. Beneath them, in a stationary position, there is a closure plate 28 which in the conveying direction 11 extends as far as the end of the feed section 4 and in the opposite direction extends as far as a wall 29 by which the space 17 beneath the grate is closed off to the rear and toward the side walls. The top side of the plate 28 is sealed off from the lower end faces 26 of the side cheeks 25, for example by the plate 28 being pressed onto the end faces 26 by spring force. In this way, the direct admission of compressed air from the space 17 beneath the grate to the air passage openings 12 is prevented as soon as these air passage openings or the associated catching profiled sections 18 are located behind the front edge of the plate 28. To prevent air from flowing out of the space beneath the grate, in the opposite direction to the conveying direction, between the top side of the plate 28 and the catching profiled sections 18 to the air passage openings 12, transverse webs 37, which run down all the way as far as the top side of the plate 28, are provided between successive catching profiled sections 18. Alternatively, it is also possible for the lower edges of the catching profiled sections 18 to interact in a sealing manner with the plate 28.

Should bulk material pass into the area below the feed section 4, it can be collected outside the space 17 beneath the grate which is under an excess pressure, in a collection chamber 30 (FIG. 5), from where it can be sucked out continuously or from time to time.

As an alternative to the seal effected by the plate 28 beneath the grate, it is also possible to provide a cover in the gap 21 above the grate.

A further possibility for sealed connection of the grate section 5 to the grate section 4 is shown in FIGS. 11 and 13. While the planks 10 are designed to be air-permeable with catching profiled sections in the region of the hollows 14, as described above, the plank end, in the region of the hollow 14', is equipped with a closed base 55 which is not permeable to air. Only this section of the plank which is not permeable to air moves under the grate section 4, thus obviating the lead to provide a special closure plate (No. 28 in FIG. 5) which prevents the air from passing through. This section 55 of the plank which is not permeable to air is protected from the influence of the high temperature of the material coming off the grate section 4 by the material which has been collected in the hollow 14'.

To seal the grate section 5 with respect to the grate section 4 there is a sealing arrangement which on the one hand beneath the grate section 4 comprises a sealing plate 57 arranged parallel to the grate section 5 and on the other hand at the rear end of each plank comprises a sealing device 56 which interacts therewith. The sealing plate 57, for which it is necessary to reckon with wear, is suspended in holes 59 in a bearing plate 60 by means of hooks 58 in such a manner that it can easily be exchanged and is fixed in the suspended position by means of a screw 61. After the screw 61 has been loosened, it can easily be removed and exchanged. The sealing device 56 at the rear end of the plank 10 moves with the plank between two limit positions, the front one of which is indicated by continuous lines and the rear one of which is indicated by dot-dashed lines in FIG. 13.

The sealing device 56 comprises a U-profiled section 62 which is secured to the rear end of the air-impermeable plate 55 and between the limbs of which the web 63 of a T-profiled section is guided moveably in a plane which lies transversely with respect to the longitudinal direction of the plank 10. The flange 64 of the T-profiled section is pressed onto the sealing plate 57 by a spring 65 in such a manner as to form a seal.

As can be seen most easily from FIG. 11, the T-profiled section 63, 64 is divided in the center. The two parts are joined by a Z-joint 66, so that a gap which is permeable to material is not formed even when the two parts move laterally apart. The two parts are each acted on by the spring 65 via inclined links 67 in such a manner that they are pressed not only upward onto the sealing plate 57 but also laterally outward. As a result, their ends, which are likewise provided with a flange 68, are pressed onto the outer surfaces of the U-profiled section 47 described above with reference to FIG. 10. In this way, the hollow 14', at its rear end, is sealed both horizontally and vertically over its entire cross section with respect to the stationary parts 57 and 47. This seal is retained in each phase of the movement, since the sealing device 56 moves with the plank. The sealing force by which the flange 64 bears against the sealing surfaces of the plate 57 and of the profiled section 47 is determined by the spring 65. The prestress of this spring can be set by means of the setscrew 69.

The embodiment illustrated in FIG. 11 assumes that the sealing gaps between adjacent planks are covered by a downwardly open U-shaped profiled section 47 (cf. explanations given in connection with FIG. 10). The ends of the T-profiled sections 63, 64 are sealed against the side faces of these U-profiled sections. If the seal between adjacent planks is designed in the manner illustrated in FIG. 14, one end of the T-profiled section 63, 64 bears against the outer surface of the wall 71, 34 of the adjacent plank where it forms a seal. A seal of this type is not required at the other end of the T-profiled section.

Since the individual planks each move separately from the other planks, it is possible, by changing their stroke length or stroke frequency, to adjust their conveying influence which they exert on the material and in this way to adjust the conveying speed of the material located on them separately with respect to the other planks and/or the material located thereon. According to the invention, this fact is exploited through the fact that the selected properties of the material located on one specific plank or a group of planks which may be of significance for determination of the conveying rate are measured by means of suitable sensors and the conveying speed of the plank (or more specifically: its stroke frequency or stroke length or both) is influenced automatically as a function of these measurements. By way of example, the temperature of the bed of material located on a plank is determined by radiation measurement of the surface of the bed of material or by measuring the temperature of the cooling air which prevails immediately above this bed, or alternatively a temperature profile across the width of the grate can be determined at the cooler end by means of thermocouples or pyrometers. In this case, it is expedient to use in each case one measuring point per plank. The conveying speed of the plank can be continuously controlled as a function of these measurements. If the temperature rises, the speed is reduced, in order to lengthen the residence time of the material in the cooling area, or vice versa. As an alternative to continuous control, it is also possible to periodically reduce the speed if an increase in temperature is determined, and vice versa.

It is also possible to use this adjustment or control of the conveying speed in a targeted manner to combat specific undesirable operating states. Some materials tend to form hot flows, for example fine clinker toward the edge ("Red River"), and this can be located by temperature scanners and assigned to individual planks. Then, the stroke length (or the stroke frequency or both) can be reduced by control technology means for the planks in question until the temperature profile has evened itself out across the width of the grate. The reduction of the stroke length in the hotter zone causes the residence time of the combustion material to increase in that zone and therefore makes the cooling of this material more intensive.

It will be clear that the invention makes it possible to achieve any desired length of cooling grates without any friction losses with respect to the grate occurring in the advancing stroke. Although during the return stroke there is some friction between the planks which are executing the return stroke and the bed located thereon, the return-conveying influence of these planks is low. This results in highly efficient conveying of the material. The seal between adjacent planks and/or the housing may be accommodated outside the hot area. There is also no need for conveying elements to be arranged within the hot area. The moving parts can be substantially protected from wear and the influence of heat by material-trapping hollows. The stroke length can be selected to be considerable, for example between 100 and 1000 mm, preferably between 300 and 600 mm. This results in a low stroke frequency and a correspondingly low level of wear and also a low load on the drive members. The stroke length can be set differently across the width of the cooler in order to take account of different materials properties transversely across the width of the bed and in particular to avoid the Red River phenomenon in the clinker. It is possible to achieve a uniform action of air over the width of the grate, since those regions of known grates in which the air supply is blocked by sealing or drive elements are not present or at least can be reduced to a minimal size. The space beneath the grate can be divided by partitions in the transverse and longitudinal directions, so that targeted ventilation, for example of the edge region, can be achieved even without the need for flexible ventilation lines.

The invention claimed is:

1. An apparatus for cooling hot bulk material using a cooling gas at a temperature lower than a temperature of the hot bulk material, comprising:
    a grate comprising a plurality of separately driven adjacent planks which are elongate in the conveying direction, the grate being configured to convey a layer of the hot bulk material lying on the grate from a feed end of the apparatus toward a delivery end of the apparatus in a conveying direction and through which the cooling gas flows, the grate further comprising material-holding recesses on the surface of the grate which include air passage openings and the feed end of the grate being covered by a feed section which extends above a plane of the grate,
    a seal between the feed section and the grate,
    material-holding recesses provided in the feed end of the grate,
    the air passage openings in the material-holding recesses in the feed end being blocked off from the air supply in the region which is covered by the feed section,
    a conveyance passage configured to convey the cooling gas into the apparatus so that the cooling gas passes from an underside of the grate to an upper side of the grate through the air passage openings and through the layer of hot bulk material on the grate, and
    a drive moving the planks forward and backward in an advancing stroke and a return stroke in the conveying direction and controlling the motion of the planks in such a way that the return strokes of adjacent planks take place non-simultaneously and the advancing strokes of adjacent planks take place simultaneously.

2. The apparatus of claim 1, wherein no conveyor members lie above the grate.

3. The apparatus of claim 1, comprising stationary edge planks.

4. The apparatus of claim 1, further comprising stationary intermediate planks between driven planks.

5. The apparatus of claim 1, further comprising a sealing device between the planks and a side wall.

6. The apparatus of claim 1, further comprising sealing devices between adjacent planks.

7. The apparatus of claim 6, wherein the sealing device comprises a longitudinal channel beneath the grate which accommodates some of the bulk material.

8. The apparatus of claim 6, wherein the sealing device comprises a strip which is configured to penetrate into a layer of the bulk material.

9. The apparatus of claim 8, wherein the strip is immersed in a bed of material located on an adjacent plank and a vertical wall is arranged at the adjacent plank behind the strip.

10. The apparatus of claim 8, wherein a stationary sealing profiled section having two strips is arranged in the conveying direction and is configured to be immersed in the layer of bulk material located on two adjacent planks.

11. The apparatus of claim 10, wherein the stationary sealing profiled section is connected to a wall which is arranged between two planks and separates associated spaces beneath the grate.

12. The apparatus of claim 8, wherein the sealing device is ventilated.

13. The apparatus of claim 8, wherein the grate comprises a channel extending in the conveying direction configured for receiving the layer of bulk material therein and the lateral spacing between the strip and an adjacent channel wall is greater than the vertical spacing between the strip and the bottom of the channel.

14. The apparatus of claim 8, wherein the grate comprises a channel extending in the conveying direction configured for receiving the layer of material therein and the lateral spacing between the strip and an adjacent channel walls is greater than a lateral play of the plank or planks.

15. The apparatus of claim 14, wherein the channel is open at the delivery end.

16. The apparatus of claim 14, wherein the channel is open at the feed end.

17. The apparatus of claim 8, wherein the sealing device comprises a longitudinal channel, which accommodates some of the material, beneath the grate.

18. The apparatus of claim 1, which is configured to receive the material which is to be cooled by the apparatus from a preceding firing furnace and is configured to pass at least a part of the cooling gas, after the cooling gas has passed the grate and the layer of material, into the firing furnace.

* * * * *